No. 753,268. Patented March 1, 1904.

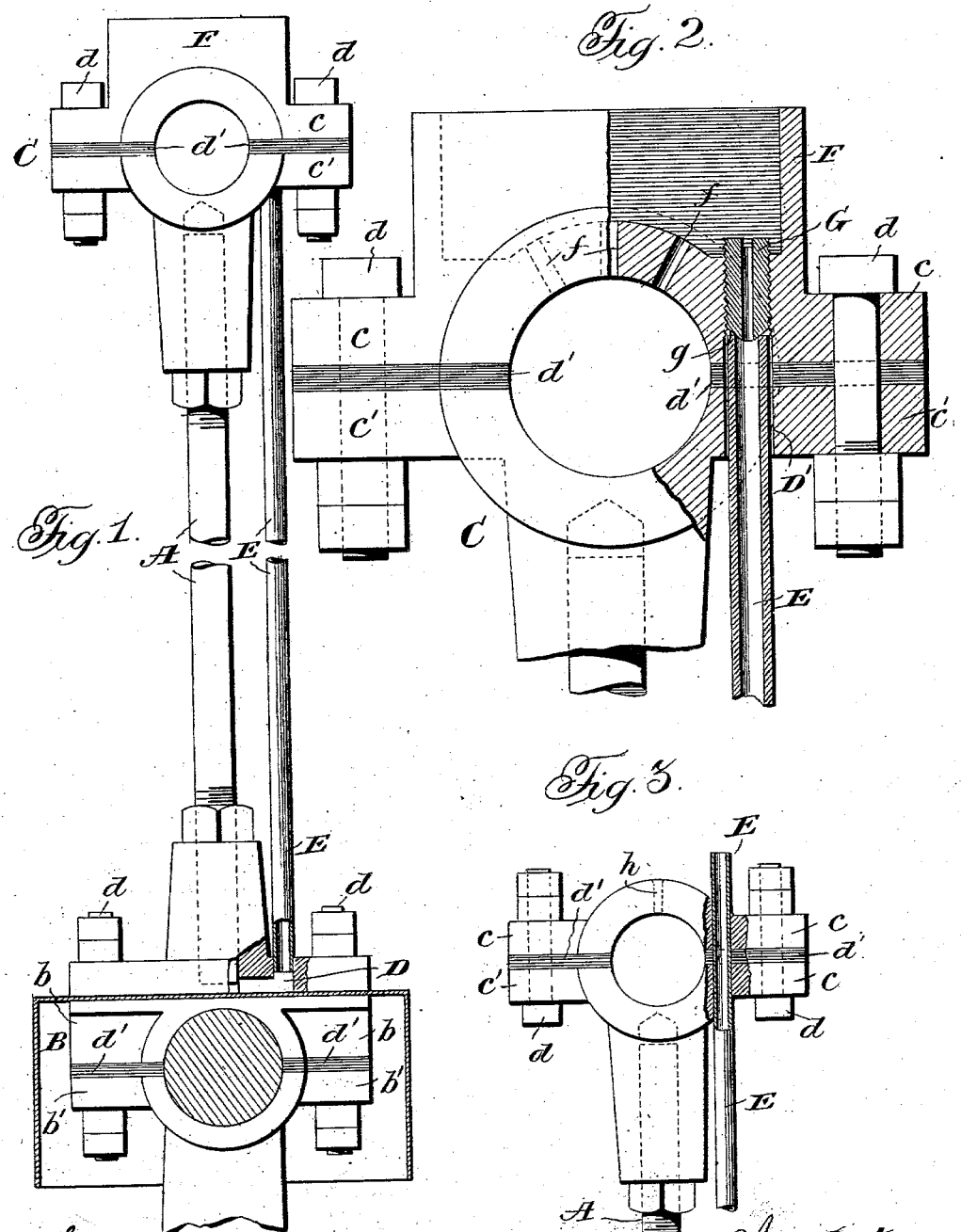

UNITED STATES PATENT OFFICE.

GEORGE D. HUNTER, OF BLOOMINGTON, INDIANA.

STONE-SAWING MACHINE.

SPECIFICATION forming part of Letters Patent No. 753,268, dated March 1, 1904.

Application filed May 26, 1903. Serial No. 158,860. (No model.)

*To all whom it may concern:*

Be it known that I, GEORGE D. HUNTER, a citizen of the United States, residing at Bloomington, in the county of Monroe and State of Indiana, have invented certain new and useful Improvements in Stone-Sawing Machines; and I do hereby declare the following to be a full, clear, and exact description of the invention, such as will enable others skilled in the art to which it appertains to make and use the same.

This invention relates to a lubricating device for suspension-rod bearings, more particularly the upper and lower bearings of a swinging stone-saw frame.

Heretofore in stone-sawing machines wherein the saws have been secured in pivotal bearings secured to the lower or free end of a swinging frame it has been found extremely difficult and often impossible to properly lubricate the lower bearing except when the machine is at rest or stopped, owing to the great vibration of the hanger-frame at this point.

The present invention, although adapted for simultaneously lubricating both the upper and the lower bearings of the hanger-frame, is especially devised to facilitate the lubrication of the lower bearing when the machine is in operation. This primary object is accomplished by employing in connection with the oil-feed in the lower bearing an elongated feed-tube leading upwardly away from the bearing to a considerable extent, which will enable the oil to be delivered to said tube, and incidentally to the bearings, at the point of its least vibration, said tube in the swinging movement of the frame describing an arc around the upper stationary pivot-bearing, as will be obvious.

The invention further contemplates the employment of a feed-tube leading from a suitable supply-chamber adjacent and adapted to furnish lubricant to the upper bearing down to the lower bearing, the connection of the tube being such that should the hanger-rod of the supporting-frame become broken the tube may be withdrawn from one of the bearings to prevent the former becoming damaged.

Novel details in the construction and arrangement of the several parts will be apparent from the description hereinafter when taken in connection with the accompanying drawings, forming part hereof, and the appended claims.

In the drawings the preferable embodiment of the invention is shown for the purpose of illustration, and when hereinafter referring to the same like reference characters will refer to corresponding parts in the several views.

Figure 1 is a side elevation of the upper and lower bearings of a swinging hanger for saw-gangs having the present invention applied thereto. Fig. 2 is an enlarged detail view of the upper bearing with the associated parts, portions being shown in section; and Fig. 3 is a view corresponding to Fig. 2 of a modified embodiment of the invention.

Referring more specifically to the drawings, A designates the connecting-rod of a swinging hanger of the nature described, B the pivot-bearing carried by the lower end of the rod, adapted to receive a gang-saw frame or the like, and C the upper stationary pivot-bearing adapted to support the rod and the parts carried thereby. These bearings may be of any usual or preferable type, preferably comprising oppositely-disposed members $b$ $b'$ $c$ $c'$, respectively, secured together by suitable bolts $d$, and having suitable packing $d'$ between the sections. In the member $b$ of the lower bearing a suitable oil-opening D is provided, into which fits an elongated feed-tube E, leading upwardly to such an extent as to project into an opening D' in the member $c'$ of the upper bearing. The tube E is adapted to snugly fit the lower bearing and may be screw-threaded thereinto, if desired; but its upper end passes loosely the opening in the member C and also projects slightly into a corresponding opening in the member $c$ of the upper bearing for the purpose to be hereinafter pointed out.

Rigidly secured to the upper bearing member $c$ is an oil-receptacle F, adapted to receive a suitable lubricant and feed the same through suitable apertures $f$ to the bearings C. At one side of the oil-chamber a screw-threaded nipple G, provided with an elongated opening, leads therefrom into the upper end of the feed-tube E. This screw-threaded nipple is adjustable through the medium of the threaded engagement with the aperture in the member c and is adapted to bear against the upper portion of the feed-tube and confine the same against lateral play, this being accomplished by slightly beveling the end of the nipple, as at g, which permits of the same projecting into and centering the tube.

From the above it will be apparent that by having the feed-tube leading from the lower to the upper bearings of the hanger-frame oil may be supplied to said tube at the point of its least vibration—i. e., at the stationary pivotal point—so that all difficulty heretofore experienced in oiling the lower bearing and the injury so often resulting to the operator therefrom are entirely overcome. By having one end of the feed-tube loosely entering one of the bearings should the hanger-rod become broken the free end of the feed-tube will slip away from the bearing, thereby obviating the danger of the tube becoming broken.

In the embodiment of the invention disclosed in Fig. 2 the oil-chamber is dispensed with, and the upper bearing is simply provided with the usual oil-opening h. The oil-feed tube in this instance passes upwardly entirely through alined apertures in the two parts of the bearing, and oil is fed directly into the end of the tube itself from any suitable source of supply rather than from a receptacle, as in the former instance. Either or both ends of the feed-tube may have a loose connection with the respective bearing with which it is immediately associated.

It is to be understood that although particular illustrations of this invention have been made and referred to, it is not the intention to be limited to the special disclosure, because various changes in the details of construction and arrangement of the several parts may be readily made without in the least departing from the spirit of the invention.

Having thus described the invention, what is claimed as new, and desired to be secured by Letters Patent, is—

1. In combination with a swinging hanger-rod, a stationary bearing at one end thereof, a bearing carried by the free end thereof, a feed-tube leading from one bearing to the other, and an adjustable nipple adapted to bear against one end of the tube, substantially as and for the purposes described.

2. In combination with a swinging hanger-rod, a stationary bearing at one end thereof, a bearing carried by the free end thereof, and a feed-tube projecting from one bearing into the other, and a nipple having a screw-threaded engagement with one of the bearings adapted to project into one end of the tube and restrict the movement thereof, substantially as described.

3. In combination with separated bearings, a feed-tube therebetween, and means for securing the tube in place including an adjustable nipple bearing against one end of the tube.

4. In combination with separated bearings, a feed-tube therebetween, and means for securing the tube in place including an adjustable nipple having a beveled end portion bearing against one end of the tube.

5. In combination with a swinging member, bearings at the upper and free ends thereof, said upper bearing comprising separated members, and means for securing the same together, and means for lubricating both bearings comprising a chamber integral with the upper surface of the top member of the upper bearing and feeding therethrough, and an independent feed-tube leading directly from said chamber to the lower bearing.

6. In combination with a vibrating saw-frame, a pivot-bearing for the upper end thereof having a vertically-disposed aperture therethrough arranged laterally beyond one side of its pivot, a bearing carried at the free end thereof, and an oil-supply conductor for said lower bearing leading therefrom upwardly into said vertical aperture in the pivot-bearing and through said bearing.

In testimony whereof I affix my signature in presence of two witnesses.

GEORGE D. HUNTER.

Witnesses:
J. W. O'HARROW,
FRANK P. WOODWARD.